Aug. 20, 1935.  C. M. MILLICAN  2,011,687
ZIGZAG HARROW
Filed May 29, 1933   2 Sheets-Sheet 1

C. M. Millican
INVENTOR
BY
ATTORNEY

Aug. 20, 1935.  C. M. MILLICAN  2,011,687
ZIGZAG HARROW
Filed May 29, 1933  2 Sheets-Sheet 2

C. M. Millican
INVENTOR

ATTORNEY

Patented Aug. 20, 1935

2,011,687

UNITED STATES PATENT OFFICE 2,011,687

ZIGZAG HARROW

Charles M. Millican, Grapevine, Tex.

Application May 29, 1933, Serial No. 673,361

2 Claims. (Cl. 55—3)

This invention relates to agricultural implements and it has particular reference to an implement for cultivating cotton and other similar row crops.

The principal object of the invention is to provide an implement for removing foreign vegetable growth and for thinning the stand of cotton or the like and generally improving its condition by moving the soil about the stalks.

The invention comprehends the provision of two or more toothed bars, with means for moving the bars endwise yet constraining them to so move in a relatively parallel plane. The teeth of the bars being equi-distantly spaced and directed downwardly into the soil, are moved in a circuitous path along the row and as one tooth succeeds another across the row as the machine advances, much of the foreign vegetable matter is removed as well as part of the superfluous stand, yet a desired number of stalks are removed from the row, leaving a suitable stand untouched.

The invention further aims to provide among its objects, means to adjust the tooth carrying bars so as to effect spacing of the groups of teeth carried by the bars so as to reduce or increase the distance between the intersecting paths of the teeth as they are drawn across the rows of vegetation in a zigzag manner.

Yet another object of the invention is to provide means for reducing the implement to a rigid harrow in which condition it is adapted for many uses.

With the foregoing objects as paramount the invention has particular reference to its salient features of construction and arrangement of parts which will become manifest as the description proceeds, taken in connection with the accompanying drawings, wherein.

Continuing with a more detailed description of the drawings, 1 designates the wheels of the implement mounted upon an axle 2. The wheels and axle are conventional, but it is understood that the wheels are made rigid with the axle through the medium of ratchets 3, in order that the implement will be inoperative when moved backwards.

Figure 1:
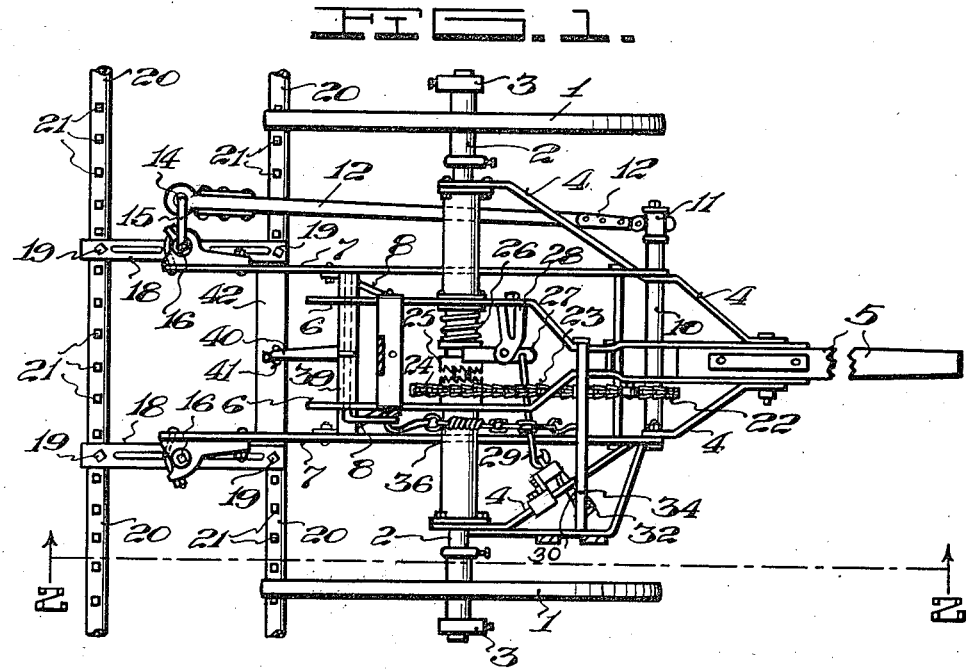
Figure 1 is a plan view of an implement constructed according to the present invention.
Figure 2:
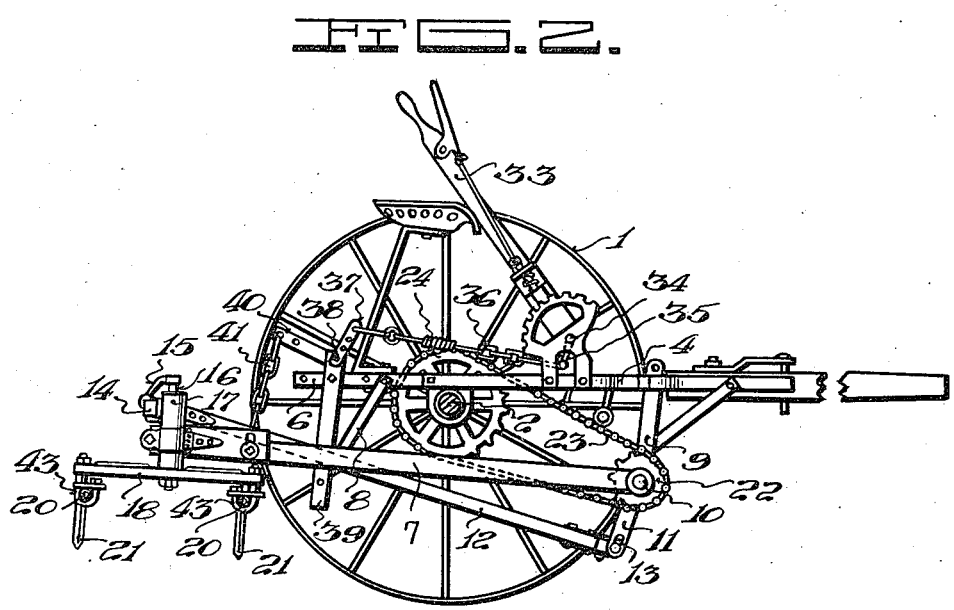
Figure 2 is a side elevation on lines 2—2 on Figure 1.

To the axle 2 is connected a frame 4 which extends forwardly to provide a connection for the tongue 5. Bars 6 are secured to the frame 4 and extend rearwardly and support the horizontal beams 7 through the medium of the depending members 8. The forward ends of the beams 7 are suspended by depending members 9 at the front of the machine, as shown in Figure 2 and these members 9 also carry a shaft 10. On one end of the shaft 10 is mounted a crank 11, to the free end of which is pivotally connected one end of a pitman 12. The connection between the pitman and the member 11 provides for an adjustment at 13, in order that the throw of the pitman may be lengthened or shortened. The other end of the pitman is connected through the medium of a ball and socket 14 to an arm 15, the arm in turn being joined to stub shaft 16, passing through sleeve 17 and rigidly connected to a bar 18. Two assemblies of shafts, sleeves and bars are provided, the bars 18 being in the parallel relationship shown in Figure 1 and having their ends pivotally connected at 19 to the parallel bars 20. The bars 20 have secured thereto a multiplicity of spikes or teeth 21 in equi-distantly spaced relationship and the bars 20 are arranged to be raised and lowered in a manner to be presently explained, to raise and lower the teeth relative to the earth.

Mounted upon the shaft 10 at the forward end of the machine is a sprocket 22, over which passes a chain 23, the latter also surrounding a large sprocket 24 mounted upon one section of the clutch 25, the latter being freely mounted upon the axle 2. The companion section of the clutch 25 is keyed to the axle 2 and movable relative to the opposing section of the clutch and normally urged to engaged position by means of the spring 26. The clutch fork 27 is pivoted to a bracket 28, as apparent in Figure 1.

Figure 3:
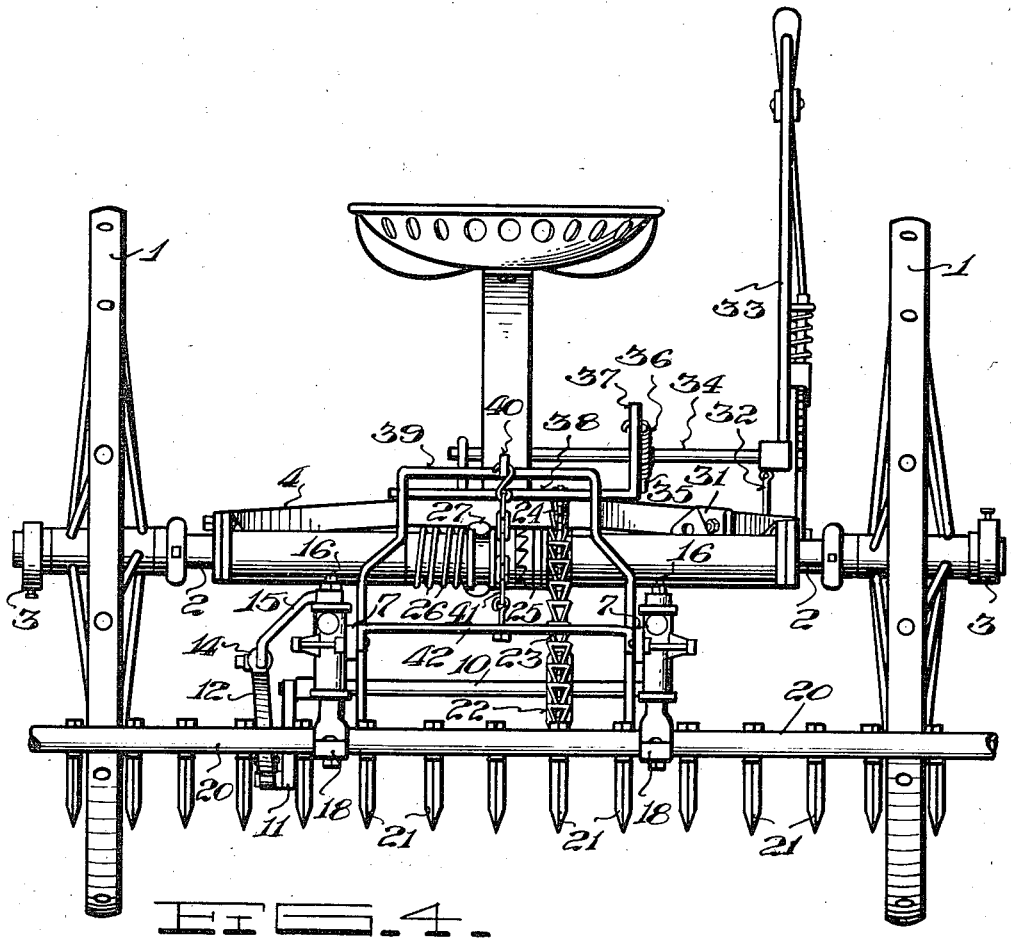
Figure 3 is a rear elevation.
Figure 4:
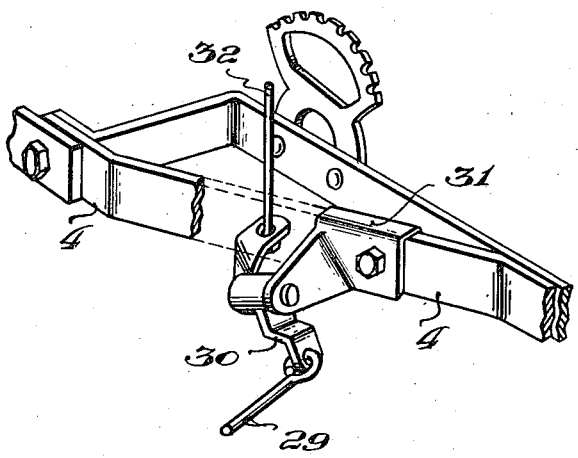
Figure 4 is a fragmentary perspective view of the clutch operating device.

A rod 29 is connected to the free end of the yoke 27 and is pivotally joined to a bell crank 30, better seen in Figure 4. In this figure, the bell crank 30 is shown as being pivoted to a bracket 31 secured to the frame 4 and disposed at such an angle that an upward pull upon a rod 32 will rock the bell crank and exert a pull upon the rod 29 to move the sliding section of the clutch 25 to disengaged position. The vertical rod 32, shown in Figure 4 is likewise shown at the right in Figure 3 as being connected to the hand lever 33.

The hand lever 33 is also effective in raising and lowering the toothed bars 20. It will be noted that the lower end of the lever is secured to a horizontal shaft 34 to which is rigidly secured an arm 35. The chain 36, having a section of spring therein joins the arm 35 to crank 37. See Figure 2. The crank 37 is a part of a shaft 38 which extends through the upper portion of a yoke 39. Midway between the ends of the shaft 38 is a rigid arm 40 and depending from the outer end of this arm is a chain 41, the lower end thereof being secured to a plate 42, rigidly disposed between the beams 7. Suitable adjustments are provided for the connection between chain 36 and crank 37 as well as between chain 41 and the arm 40. The former adjustment brings about greater tension upon the raising and lowering mechanism while the latter adjustment determines the height to which the toothed bars may be raised and lowered by the lever 33.

When the lever 33 is moved rearwardly a pull is exerted upon the chain 36, which moves the arms 37 and 40 in a clockwise direction, thus pulling upwardly on the chain 41 to raise the toothed bar assembly.

It will be noted in Figure 4 that the rod 32 is freely slidable through the aperture in the bell crank 30 and normally, the lower end of the rod 32 is well below the aperture and during the initial movement of the lever 33 to raise the toothed bar assembly, the lower end of the rod 32 is being moved into engagement with the bell crank and as the lever 33 is finally moved in the raising operation, the arm 32 is engaged with and rocks the bell crank 30 to exert a pull upon the rod 29 to release the clutch 25. This arrangement is provided for in view of the fact that in the raising operation, the lever 33 is required to move a greater distance than is necessary to effect disengagement of the clutch.

In operation, the lever 33 is moved forwardly to lower the toothed bars 20 to effect engagement of the teeth 21 with the soil. During this operation, the clutch 25 is engaged and as the implement is propelled along, shaft 10 is rotated through the medium of the chain and sprocket assembly and by virtue of the connection between the pitman 12 and the crank 11 on the shaft 10, reciprocating motion is imparted to the bars 20, thus causing the groups of teeth to move across the rows of vegetation in a zigzag fashion. When it is desired to use the implement as a rigid harrow, the pitman 12 is disconnected from the crank 11 and suspended from some point on the frame. In so using the implement, the ends of the bars 20 may be alined to allow the teeth of one bar to fall in the path of those of the companion bar or the bars may be adjusted so that the path of the teeth of one bar will be interposed between the paths of those of the companion bar.

When it is desired to increase or decrease the width between the groups of teeth 21, the position of the U-clamps 43 is changed. In Figure 2, the clamps 43 are shown in a position to bring the groups of teeth nearer the axis of the shaft 16. The distance between the groups may be increased by reversing the position of one or the other of the U-clamps and still further in- creased by reversing the position of both clamps.

In practice it has been found that by changing the angle of the teeth 21 with respect to the ground different results may be secured. For example, by directing the teeth forwardly or in the direction in which the machine is moving, the soil is pulverized to a more satisfactory degree than when the teeth are vertical or disposed at a reverse angle. However, in some cases, the latter positions may be found more desirable.

It is understood that while the invention has been described as a complete implement within itself, the reciprocating bars 20 and the mechanism by which these bars are actuated may be embodied in an attachment, suitably suspended from any type of agricultural implement without departing from the spirit or intent of the invention. Moreover, certain changes and modifications may be made in the structure described and shown without departing from the spirit or intent of the invention as set forth in the following claims therefor.

What is claimed is:

1. An agricultural implement including a frame mounted on wheels, and having beams extending rearwardly past said wheels, a yoke arranged to support and maintain spaced relationship of said beams, vertical sleeves mounted upon the rearward ends of said beams, freely rotatable shafts journaled in said sleeves, each having bars adjustably secured thereto in parallel relationship, parallel bars pivoted to the ends of said first bars, also in parallel relationship, each having downwardly directed spikes in spaced relationship thereon, a crank mounted on one of said shafts, a pitman arm connected to said crank at one end and having its opposite end terminating adjacent the front of said frame, means for imparting motion to said arm from the wheels of said implement and means for raising and lowering said yoke to effect similar movements of said spiked bars.

2. An agricultural implement comprising a wheeled frame having a rotatable shaft disposed forwardly thereof and a pair of beams connected to said shaft and extending rearwardly of said frame beyond its wheels, vertical sleeves carried by the ends of said beams, shafts mounted in said sleeves and supporting bars midway of their ends whereby said bars will be maintained in parallel relationship, spiked bars pivoted to the ends of said first bars in parallel relationship, a crank carried by said first shaft, a second crank carried by one of said last mentioned shafts, a pitman arm connecting said shafts, means for driving said first shaft from the wheels of said implement to effect reciprocative movement of said spiked bars and means for raising and lowering said spiked bars from a point on said frame.

CHARLES M. MILLICAN.